United States Patent Office 3,205,172
Patented Sept. 7, 1965

3,205,172
UNIVERSAL MACHINING FLUID
Charles H. Benton, Rochester, N.Y., assignor to Eastman Kodak Company, Rochester, N.Y., a corporation of New Jersey
No Drawing. Filed Dec. 22, 1961, Ser. No. 161,432
9 Claims. (Cl. 252—49.5)

This invention relates to the art of machining. More particularly, it relates to that part of the art involving cutting fluids and the like.

It is conventional practice in the operation of machine tools to apply a fluid to the machine tool and work being machined for such purposes as removal of heat generated by engagement of the tool with the work, lubrication of the tool and work in the region of tool engagement with the work, and facilitation of rapid chip removal from this region. Such a fluid has been referred to as a cutting fluid. It is here referred to as a machining fluid.

Over the years a large variety of simple and complex machining fluids have been developed as a result of an ever increasing number of exacting requirements which have arisen as a result of numerous new and improved as well as vastly differing materials of construction employed in the work and in the machine tool, higher tool speeds, etc. Historically, only water was employed as a machining fluid, then water-soda solutions, followed by mineral oil, natural fats and oils, sulfurized and phosphorized oils, chlorinated compounds, various mineral salts and many combinations of these base compounds. Still, none of these compounds or combinations of these compounds has been entirely satisfactory for one or more reasons.

In this regard, a good machining fluid should meet each one of the following requirements:
(1) Broad application,
(2) High load bearing strength and good anti-friction properties,
(3) Anti-weld properties,
(4) High heat removing ability,
(5) Oxidation stability,
(6) Resistance to attack by microorganisms,
(7) Low volatility,
(8) Non-corrosivity and anti-rusting,
(9) Clarity,
(10) Ability to function as a machinery lubricant and hydraulic fluid,
(11) Absence of components harmful to the human skin or not readily cleared from human lungs by natural body processes.

The compounds and compositions hertofore developed for machining fluid use are generally quite specific to a narrow range of machining operations, machine tool materials of construction and/or work materials of construction. None are in fact truly universal or general purpose in application. For support of this fact see the April 1961 issue of Machinery, pages 122–125. This presents a serious problem in many, if not most, machine shops wherein articles of different materials of construction are frequently machined side by side or interchanged on one machine. Heretofore, this has resulted in these shops stocking a variety of machining fluids according to their anticipated needs.

Heretofore, in order to obtain high load bearing and good anti-fraction properties certain compositions containing free sulfur and chlorine have been employed in some instances and in other instances compositions having relatively high viscosities have been used. These sulfur and chlorine containing compositions are corrosive, however, and tend to discolor certain metals such as brass and copper. The high viscosity compositions are inadequate to remove heat from the work and do not penetrate readily to the tool. In addition, the high viscosities of such compositions result in substantial percentages of machining fluid clinging to the chips. In some instances, this has resulted in treatment of the chips to recover the machining fluid. In other instances no attempt is made to recover the machining fluid.

High heat removing ability means rapid removal of a lot of heat per unit volume of machining fluid and ready flow of the fluid through all areas of the cutting operation. For high heat removing ability, the machining fluid should be relatively dense, have high heat capacity and good heat transfer, and be quite fluid. To provide these properties, a low viscosity composition has heretofore been employed. However, the low viscosity compositions heretofore developed usually do not have the desired degree of load bearing and anti-friction properties. Moreover, because low molecular weight compounds are employed in these compositions in order to achieve the low viscosity condition, these compositions generally have such a high order of volatility that they are usually vaporized by the heat generated in the machining operation. This promotes objectionable smoke and vapor in the area of the machine and often throughout the entire machine shop.

For the greatest economy and best operating performance it is important that machining fluids have a high degree of oxidative stability and be resistant to microorganism attack. Many of the compounds, such as lard oil and sulfurized compounds, heretofore incorporated into machining fluids in order to provide high load bearing properties are quite susceptible to oxidative attack and to attack by micro-organisms. As a result, under use conditions machining fluids containing such compounds give rise to objectionable odors and to the formation of varnishes on machine parts.

With regard to the clarity of the machining fluid, if the machining fluid composition is not clear, there is a tendency for the fluid to obscure the work from the machine tool operator's view. In this regard those machining fluids formulated with highly sulfurized compounds to give extremely high load bearing properties and thereby the best lubrication betwen the tool and the work are dark in color and lack clarity.

Quite generally, in most conventional machining operations, the best lubricating and cooling effects are obtained when the machining fluid is generally flooded on the work being machined and in the region of tool engagement. This causes a certain amount of splashing. As a result, there is a tendency for the machining fluid to get into the hydraulic fluid used to operate certain types of machine tool parts and to get into the bearings and other working parts of the machine. It is important, therefore, that the machining fluid be adequate as a machinery lubricant and as a hydraulic fluid. Many of the heretofore existing machining fluids are just not adequate as machinery lubricants and hydraulic fluids.

Toxicity of the machining fluid is an important factor in view of this splashing aspect, in view of the fact various parts of the machine or of the work are handled or manipulated by the machine operator and in view of the use of coolant mist generators on machines for the mist application of machining fluids. As a matter of fact, industrial hygienists are seriously concerned about the inhalation of vapors of mineral oil and other non-metabolizable components of machining fluids in machine shops where mist coolant generators are used. Nearly all machining fluids heretofore in use contain mineral oil lubricants. Mineral oil accumulates in the human lung upon inhalation and is not absorbed. In addition, many of the machining fluids heretofore in use cause dermatitis.

Thus, up to now, machining fluids generally have been deficient in one or more respects.

An object of this invention is to provide a machining fluid which avoids the various disadvantages and deficiences of the prior art machining fluids.

A specific object of this invention is to provide a machining fluid which substantially meets each one of the various requirements now recognized for a good machining fluid.

These objects and others are achieved by this invention which is based on the discovery that a triglyceride composition normally liquid at normal temperatures and consisting essentially of a triglyceride having a molecular structure characterized by one higher fatty acid moiety and two acetic acid moieties is all by itself an effective machining fluid, meeting each one of the aforementioned requirements and giving advantageous results beyond these requirements.

In summary, this invention broadly comprises a machining fluid consisting essentially of a diacetyl triglyceride product that is liquid at least at the prevailing use temperature and that is composed of at least one triglyceride having one higher fatty acid moiety and two acetic acid moieties. The higher fatty acid moiety is an acyl radical having a carbon atom content in a range from about 8 to about 22 carbon atoms, preferably from about 14 to about 20 carbon atoms and usually from about 16 to about 18 carbon atoms. In the preferred embodiments of this invention the fatty acid moiety usually is chemically unsaturated. Preferably the degree of unsaturation is equivalent to the fatty acid moieties of lard.

In its more specific embodiments, the machining fluid of this invention consists essentially of a diacetyl triglyceride product normally liquid at least at machining fluid use temperatures and preferably liquid at lower temperatures, and consisting essentially of a mixture of glycerides having fatty acid moieties and acetic acid moieties with the acetic acid moieties on a molecular equivalent basis being in excess compared to the fatty acid moieties. Typical and preferred examples of such a triglyceride product are the normally liquid, so-called acetylated monoglyceride products. These products are commercially prepared by interesterifying vegetable and animal fats and oils (triglycerides having all higher fatty acid moieties) with triacetin (a triglyceride having all acetic acid moieties) and, in some instances, with added glycerol, the quantities of these reactants being selected to give a molecular equivalent excess of acetic acid moieties compared to the higher fatty acid moieties. The reaction is promoted with soap catalysts at a concentration of about 1-2% by weight. Typical interesterification reaction conditions are 0.5-1.5 hours and 230-260° C. For more information on reaction conditions see the U.S. Patents Nos. 2,808,421 and 2,879,281, to Brokaw. Usually, the resulting reaction product in each case is stripped in a molecular still (about 120° C. at about 100 microns of mercury pressure) to remove acetylated glycerol and then distilled (about 185° C. at about 10 microns' pressure) to remove catalysts, acetylated diglycerides and non-acetylated triglycerides. The resulting distilled products each consist essentially of the diacetylated type of triglycerides at a concentration of at least about 50% by weight of the product and usually greater than about 80% by weight of the product. Commercially available, acetylated monoglyceride products range from normally liquid to normally solid depending on the extent of acetylation as well as the chemical saturation of the fat or oil from which the product is derived. The acetylated monoglyceride products which are normally liquid at normal temperatures are preferred under the concepts of this invention.

In this regard, a diacetyl triglyceride product particularly preferred under the concepts of this invention is one derived from prime lard and corresponding to a distilled monoglyceride which is essentially completely acetylated. Such a product is a normally liquid, diacetyl triglyceride product composed of a mixture of triglycerides wherein the acetic acid moieties on a molecular equivalent basis are in excess of the higher fatty acid moieties. This product is commercially available as Myvacet distilled acetylated monoglycerides Type 9–40 from Distillation Products Industries, a division of Eastman Kodak Company, Rochester 3, New York. Typical physical properties of this commercial product are: clear, almost colorless, odorless liquid; cloud point of about 10° C.; congeal point of approximately 8° C.; flash point of about 235° C.; refractive index at 50° C. of 1.443; refractive index at 40° C. of 1.447; absolute viscosity at 121° C. of 7 centipoises, at 50° C. of 19 centipoises, at 25° C. of 40.5 centipoises and at 20° C. of 50 centipoises; a specific gravity at 50° C. of 0.96 and at 20° C. of 0.99; soluble at 20° C. in all common organic solvents, 80% (volumetric basis) aqueous ethanol, vegetable and mineral oils but less than 4% (by weight) in 70% (by volume) aqueous methanol; and a Falex machine test value at about 38° C. of 1750 pounds maximum jaw load before failure (cf. to light mineral oil having at 25° C. an absolute viscosity of 23 centipoises, which gave a Falex machine test value at about 38° C. under the same test conditions of 250 pounds maximum jaw load before failure, and to heavy mineral oil having at 25° C. an absolute viscosity of 138 centipoises, which gave a Falex machine test value at about 38° C. under the same test conditions of 250 pounds maximum jaw load before failure). Typical chemical properties of this commercial product are: iodine value of 42; saponification value of 380; monoglycerides concentration ranging from 0 to 2% by weight; Reichert-Meissl value of 142, an acid value less than 4; and a rotary bomb test of 15 minutes. In machining operations wherein the machining fluid has consisted essentially of this commercial product no medically adverse effects attributable to this product have been detected.

Although the diacetyl triglyceride product of this invention inherently has unusually good resistance to microorganism attack under actual use conditions, such resistance can be further improved by the addition of a bactericide such as, for example, hexachlorophene, methyl p-hydroxybenzoate, alkyl dimethyl benzyl ammonium chloride, sodium trichlorophenate and the like, orthophenyl-phenol, hexyl resorcinol, tris-(hydroxymethyl)-nitromethane and the like. The total bactericide concentration depends generally on the specific conditions of use of the machining fluid of this invention. Generally, however, a concentration in a range from about 0.1 to about 1% by weight of the diacetyl triglyceride product of this invention is satisfactory for most purposes. Of course, greater or less concentrations can be employed.

In one specific aspect of this invention, the machining fluid comprises an emulsion consisting essentially of (1) a normally liquid diacetyl triglyceride product of this invention, (2) water and (3) an emulsifier for said product. Preferably the diacetyl triglyceride product is emulsified in the water whereby the machining fluid is an oil-in-water type emulsion. While this is the type of emulsion usually preferred, a water-in-oil type emulsion is also within the concepts of this invention. The emulsifier is one or more surface active agents effective to stabilize the emulsion of either the diacetyl triglyceride product in water or water in the diacetyl triglyceride product, depending on the type of emulsion desired. Suitable emulsifiers are sulfated higher fatty alcohols, alkylaryl sulfonates (keryl benzene sulfonate, for example) polyoxyethylene sorbitan, higher fatty alcohol ethers, surface active polyoxypropylene-polyoxyethylene block polymers and combinations of these emulsifiers with sorbitan higher fatty acid esters, monoglycerides, propylene glycol esters or the like. Although the diacetyl triglyceride product of this invention is an inherently good anti-rust agent, in the case of these aqueous emulsions it is desirable that a rust inhibitor be added to the emulsion to minimize rusting of metallic parts which may come into contact with the machining fluid. Generally speaking, while a wide variety of rust inhibitors are suitable, the combination of sodium nitrate and sodium nitrite being mentioned by way of example, those that are soluble in the triglyceride product are generally effective. In this regard sodium salts of sulfated and sulfonated organic compounds are effective rust inhibitors. Many of these compounds are effective emulsifiers for diacetyl triglycerides and when present in the emulsion as an emulsifier another rust inhibitor is generally not necessary. However, another rust inhibitor can be added if the prevailing circumstances make it desirable or necessary.

In the case of an oil-in-water type emulsion, use concentrations of the various components can vary. However, satisfactory results generally are obtained with the diacetyl triglyceride product at a concentration in a range from about 1 to about 5% of the machining fluid, water at a concentration in a range from about 94 to about 99% of the fluid with the combination of emulsifier, rust inhibitor and bactericide together being at a concentration in a range from about 15 to about 20% by weight of the deacetyl triglyceride product.

Under the concepts of this invention the user of the machining fluid can prepare the emulsion by admixing the individual components, by admixing water with a dry mixture of the diacetyl triglyceride product and emulsifier as well as other additives, if present, and by admixing water with a base composition consisting essentially of the diacetyl triglyceride product and emulsifier plus such other additives that are present. Hence, from a composition-of-matter point of view the concepts of this invention include the mixture and the concentrate compositions. In general in the concentrate the diacetyl triglyceride product concentration is in a range from about 50 to about 99% by weight while the water concentration is in a range from about 1 to about 50% by weight.

Although the dry end emulsion compositions of this invention are extremely effective machining fluids in and of themselves, they can also be added to less effective machining fluids such as, for example, those of the prior art, to improve their performance. Thus, by incorporating at various concentrations the machining fluid of this invention into machining fluids based on petroleum oils, fats, sulfurized and phosphorized compounds, halogenated compounds and the like, the performance of the latter compounds is improved.

This invention is further illustrated by the following examples of various aspects thereof, including specific embodiments. Unless otherwise indicated, this invention is not limited to these specific embodiments.

Example 1

This example illustrates a typical machining operation employing a preferred embodiment of the machinery fluid of this invention.

The lubricant coolant handling system of a No. 2 Brown and Sharpe, single spindle, full automatic, screw machine was cleaned and the sump charged with 7 gallons of a machining fluid consisting of a diacetylated triglyceride product derived from prime lard (the Myvacet Type 9–40 glycercide product previously described herein). Turning, drilling, boring and forming operations were performed on No. 135 stainless steel, a Class 6 machinability steel. A cutting speed of 108 surface feet per minute (s.f.m.) was used. The layout was such that 15 parts were completed per hour and 550 parts were made.

No smoking of the machining fluid occurred during these machining operations and the chips came off white and cool. The machining fluid of this invention dissipated heat much more rapidly than the machining fluids previously used on the machine.

Example 2

This example illustrates further the superiority of the machining fluid of this invention over previously available machining fluids from the point of view of increased production.

Another run was made on the machine of Example 1 except that a cutting speed of 126 s.f.m. was used. Actual production was 18 parts per hours, a 20% increase over that ordinarily attainable with this hard metal using previously available machining fluids. There was continued cool cutting with a white cool chip. There was no apparent increase in tool wear.

Example 3

This example illustrates the efficacy of a machining fluid of this invention in still another machining operation.

A No. 2 Brown and Sharpe, single spindle, full automatic screw machine, charged with 7 gallons of a machining fluid of this invention (specifically, Myvacet Type 9–40 product) was used for turning, drilling, boring, forming and threading operations on No. 135 stainless steel. A cutting speed of 110 s.f.m. was used. The layout was such that 15 pieces per hour were completed under ordinary operation. A run of 500 parts was made.

The job ran efficiently for over 16 hours, with no tool maintenance necessary even though conventional, high speed, carbon bits were involved. There was no tool chatter, no smoking or oil burning. There was an excellent finish on all the parts including the thread. Perfect tolerance maintenance was obtained without adjustment for expansion from heat of the tool bit or work.

Example 4

This example illustrates the preparation of an oil-in-water emulsion type machining fluid concentrate of this invention, the end use emulsion, a machining operation employing this end use emulsion and typical results obtained in the operation.

An emulsion concentrate of a diacetyl triglyceride product derived from prime lard (the previously described Myvacet Type 9–40 product) in water was prepared by homogenizing 50 parts by weight of the product in 48.2 parts by weight of water containing 0.8 part by weight sodium lauryl sulphate (Duponol ME Dry) and approximately 1 part by weight of a rust inhibitor consisting essentially of sodium nitrate and sodium nitrite.

This machining fluid concentrate was then diluted with water until the oil concentration was about 2.5% by weight, giving a machining fluid.

The machining fluid was charged into the reservoir of a mist coolant generator. This fluid was atomized by the generator and the resulting mist directed so as to cool the cutting tool of a half-inch column drill press powered with a Bellows air motor drill press drive while six holes through each of 100 bars of three-eighths inch thick, mild, stainless steel, Type 303 were drilled by the tool. The chips which resulted were unusually cool and not discolored. The steel appeared to be free cutting in using this machining fluid.

Example 5

This example further illustrates the effectiveness of the machining fluid of Example 4.

The same equipment as in Example 4 was set up and the mist coolant generator was charged with a machining fluid of this invention, prepared as in Example 4. In this instance the holes drilled in Example 4 were tapped in this machining operation while the machining fluid was atomized by the generator and the resulting mist directed onto the tap.

The tap cut was excellent and a clean, cold chip was obtained. The original tap finished all 600 holes and gave excellent threads throughout the run.

*Example 6*

This example illustrates still another machining operation involving a machining fluid of this invention.

A machinery fluid in the form of an emulsion was prepared as in Example 4. Machining operations similar to those of Examples 4 and 5 were performed on cast, No. 316, stainless steel. The drilling operation was run at 24% higher speeds than usually recommended with previously used machining fluids. A clean cold chip with no discoloration and excellent lubrication was obtained with the machining fluid of this invention. There was no noticeable tool wear after drilling a hundred holes. In the tapping operation, clean cold chips were obtained and the tapping job was completed with no noticeable tool wear. An excellent, clean thread was produced.

*Example 7*

This example illustrates still another machining operation employing a machining fluid of this invention.

A Mistic Mist coolant generator was filled with a commercial diacetyl triglyceride product derived from prime lard (Myvacet Type 9–40 product). The generator was put into operation with the resulting mist being directed onto the cutting tool of a planer. A six-foot bar of No. 135 stainless steel was cut with this equipment. Cutting speeds were twice that usually found satisfactory with previously used machining fluids. A cool, clean white chip was obtained and no smoking of the machining fluid was observed.

The machining fluid of this invention results in unusually low tool breakage and unusually low tool maintenance. The cooling qualities of the machining fluid appear much better than petroleum or fat based machining fluids partly because less heat is generated when the machining fluid of this invention is involved and partly because the machining fluid of this invention carries away much better the heat that is generated.

In addition, human skin contact results with the machining fluid of this invention are substantially better than in the case of previously developed machining fluids. Air contamination, such as smoke and vapor, by the machining fluid of this invention is very low in contrast to prior art machining fluids. No rusting effect, no adverse effect on machinery bearings and no clogging of equipment lines has occurred in using the machining fluid of this invention.

So far no limit to the range of materials of construction of the work or of the tool has appeared relative to the machining fluid of this invention, consisting of a diacetyl triglyceride product. Hence, the machining fluid of this invention is in fact universal in application, wherefore, it is a truly universal machining fluid.

Other features, advantages and embodiments of this invention will occur to those in the exercise of ordinary skill in the art after reading the foregoing disclosure. In this regard, while this invention has been described in considerable detail relative to certain specific embodiments thereof, variations and modifications of this invention can be effected without departing from the spirit and scope of the invention as disclosed and claimed.

The embodiments of the invention in which an exclusive property or privilege is claimed are defined as follows:

1. A composition for use in making up a machining fluid of the oil-in-water emulsion type, which comprises: (1) a normally liquid, diacetyl triglyceride product composed of a mixture of triglycerides with acetic acid moieties and higher fatty acid moieties derived from lard with the acetic acid moieties on a molecular equivalent basis being in excess of the higher fatty acid moieties, said product being at a concentration in a range from about 80 to about 85% by weight of said composition; and (2) an emulsifier for said product, said emulsifier being at a concentration in a range from about 15 to abuot 20% by weight of said product.

2. In a process for machining work wherein a machining fluid is employed, the improvement wherein said machining fluid consists essentially of a diacetyl triglyceride product that is liquid at least at the temperature of use and that is composed of at least one triglyceride having one higher fatty acid moiety and two acetic acid moieties.

3. In a process for machining work wherein a machining fluid is employed, the improvement wherein said machining fluid consists essentially of a normally liquid diacetyl triglyceride product composed of a mixture of triglycerides with acetic acid moieties and higher fatty acid moieties with the acetic acid moieties on a molecular equivalent basis being in excess of the higher fatty acid moieties.

4. In a process for machining work wherein a machining fluid is employed, the improvement wherein said machining fluid consists essentially of a normally liquid diacetyl triglyceride product composed of a mixture of triglycerides with acetic acid moieties and higher fatty acid moieties derived from lard with the acetic acid moieties on a molecular equivalent basis being in excess of the higher fatty acid moieties.

5. In a process for machining work wherein a machining fluid is employed, the improvement wherein said machining fluid consists essentially of (1) a diacetyl triglyceride product that is liquid at least at the temperature of use and that is composed of at least one triglyceride having one higher fatty acid moiety and two acetic acid moieties, (2) water and (3) an emulsifier for said product.

6. In a process for machining work wherein a machining fluid is employed, the improvement wherein said machining fluid is an oil-in-water type emulsion consisting essentially of (1) a normally liquid, diacetyl triglyceride product composed of a mixture of glycerides with acetic acid moieties and higher fatty acid moieties with the acetic acid moieties on a molecular equivalent basis being in excess of the higher fatty acid moieties, (2) water, (3) an emulsifier for said product and (4) a rust inhibitor.

7. In a process for machining work wherein a machining fluid is employed, the improvement wherein said machining fluid is an oil-in-water type emulsion consisting essentially of (1) a normally liquid diacetyl triglyceride product composed of a mixture of glycerides with acetic acid moieties and higher fatty acid moieties with the acetic acid moieties on a molecular equivalent basis being in excess of the higher fatty acid moieties, said product being at a concentration in a range from about 1 to about 5% by weight of said fluid, (2) water at a concentration in a range from about 94 to about 99% by weight of said fluid and (3) an emulsifier for said product, said emulsifier being at a concentration in a range from about 15 to about 20% by weight of said product.

8. A composition consisting essentially of (1) a normally liquid, diacetyl triglyceride product composed of a mixture of triglyceride with acetic acid moieties and higher fatty acid moieties, the acetic acid moieties on a molecular equivalent basis being in excess of the higher fatty acid moieties, said product being at a concentration in a range from about 1 to about 99% by weight of said composition, (2) water at a concentration in a range from about 1 to about 99% by weight of said composition and (3) an emulsifier for said product at a concentration in a range from about 15 to about 20% by weight of said product.

9. A composition useful as a machining fluid and consisting essentially of (1) a normally liquid, diacetyl triglyceride product composed of a mixture of triglyceride with acetic acid moieties and higher fatty acid moieties derived from lard, the acetic acid moieties on a molecular equivalent basis being in excess of the higher fattty acid moieties, said product being at a concentration in a range from about 1 to about 5% by weight of said composition, (2) water at a concentration in a range from about 94 to about 99% by weight of said composition and (3) an emulsifier for said product at a concentration in a range from about 15 to about 20% by weight of said product.

References Cited by the Examiner

UNITED STATES PATENTS

| | | | |
|---|---|---|---|
| 1,871,939 | 8/32 | Adams | 252—49.5 |
| 2,182,992 | 12/39 | Lebo | 252—49.5 |
| 2,632,734 | 3/53 | Nunn et al. | 252—49.5 |
| 2,695,877 | 11/54 | Nichols et al. | 252—49.5 |
| 2,808,421 | 10/57 | Brokow | 260—410.8 |
| 2,826,549 | 3/58 | Manteuffel et al. | 252—49.5 X |
| 2,879,281 | 3/59 | Brokow | 260—410.7 |
| 2,914,477 | 11/59 | Cafcas et al. | 252—49.5 |
| 2,948,681 | 8/60 | Milberger et al. | 252—49.5 |
| 2,965,567 | 12/60 | Brennan et al. | 252—49.5 |

OTHER REFERENCES

Bastian, Metalworking Lubricants, page 22, 1951.

DANIEL E. WYMAN, *Primary Examiner.*
ALPHONSO D. SULLIVAN, *Examiner.*